United States Patent [19]

Tanikawa et al.

[11] Patent Number: 4,951,312

[45] Date of Patent: Aug. 21, 1990

[54] BALANCED TRANSMISSION DEVICE

[75] Inventors: Yoshihiro Tanikawa; Yoshikazu Minakuchi; Yoshiaki Ueno, all of Kadoma, Japan

[73] Assignee: Matsushita Electric Works, Ltd., Japan

[21] Appl. No.: 343,671

[22] Filed: Apr. 27, 1989

[51] Int. Cl.$^5$ .................. H04M 19/00; H04B 3/30
[52] U.S. Cl. ................... 379/394; 379/399; 379/413
[58] Field of Search ............ 333/25, 12; 379/399, 379/324, 405, 413, 398

[56] References Cited

U.S. PATENT DOCUMENTS 3,970,805  7/1976  Thomas ........................ 379/405
4,053,722  10/1977  Nahay .......................... 379/405

Primary Examiner—Jin F. Ng
Assistant Examiner—Magdy Shehata
Attorney, Agent, or Firm—Leydig, Voit & Mayer

[57] ABSTRACT

A balanced transmission device having a pair of impedance element mutually of an equal value and connected between a pair of connecting terminals and an earthing point of an apparatus for superposing alternating signals on a direct current source and transmitting them through parallel two-wire cables. A transformer inserted as a high impedance source with respect to the apparatus for superposing and the transmitter, whereby the device can restrain any noise influence to realize smooth superposed transmission, with simpler arrangement but without enlarging it.

6 Claims, 4 Drawing Sheets

BALANCED TRANSMISSION DEVICE

TECHNICAL BACKGROUND OF THE INVENTION

This invention relates to a balanced transmission device which transmits such alternating current signals as image signals or the like as superposed on a direct current source means through two parallel cables of telephone lines, interphone lines and so on.

DISCLOSURE OF PRIOR ART

As the balanced transmission device of the kind referred to, there may be enumerated one disclosed in European Pat. No. 271,969 of S. Iwamura et al, in which an arrangement is so made that a unilaterally transmitted power is transmitted from a power supply end side through the two parallel cables to a power receiving end side, as superposed on such low frequency transmission signals as speech signals bilaterally transmitted. In this case, in particular, means for frequency modulating the transmission signals with a predetermined carrier frequency is provided on each of the power supply and power receiving end sides, and a source choke coil of an inductance value showing a high impedance with respect to the thus frequency-modulated transmission signals is further included.

With the foregoing known device, such relatively unbalanced signals as the image signal output, in particular, are to be converted into balanced signals to transmit them through the two parallel cables, and again into the unbalanced signals to be displayed by an image means and to be supplied to the power receiving end side. In the foregoing known balanced transmission device, however, there has been a problem that, while the device can be relatively small so long as the source choke coil employed is the one showing a high impedance with respect to the frequency modulated signals of at least more than 100 KHz, the entire transmission circuit is caused to be complicated and thereby enlarged.

TECHNICAL FIELD

A primary object of the present invention is, therefore, to provide a balanced transmission device which has eliminated the foregoing problems and is capable of effectively preventing any external noise from entering without causing the entire transmission device to be enlarged, and of smoothly transmitting, the alternating current signals through the two parallel cables as superposed on the direct current source means.

According to the present invention, this object can be attained by a balanced transmission device in which means for superposing the alternating current signals on the direct current source means to transmit them through the two parallel cables includes a high impedance means which prevents any noise influence of external noise or the like, characterized in that a pair of impedance means mutually of an equal value are connected between a pair of terminals to which the two parallel cables are connected and an earthing point, and a transformer having a pair of windings wound in the same direction is connected at the same polarity ends of the windings respectively to each of the pair of the terminals, at the other end of one of the windings to the direct current source means, and at the other end of the other winding of the transformer to the earthing point.

Other objects and advantages of the present invention shall now be made clear in following description of the invention detailed with reference to embodiments shown in accompanying drawings.

While the present invention shall now be explained with reference to the respective embodiments shown in the accompanying drawings, it should be appreciated that the intention is not to limit the present invention only to the embodiments shown but rather to include all alterations, modifications and equivalent arrangements possible within the scope of appended claims.

DISCLOSURE OF PREFERRED EMBODIMENTS

Figure 1:
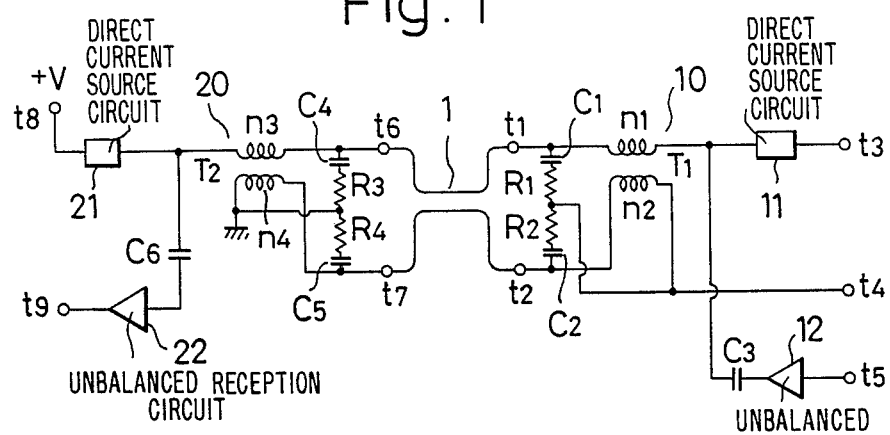
FIG. 1 is a circuit diagram of the balanced transmission device in an embodiment according to the present invention.

Referring to FIG. 1, there is shown an embodiment of the balanced transmission device according to the present invention, in which the device generally comprises a transmitter 10 and a receiver 20, which are mutually connected through two parallel cables 1.

The transmitter 10 comprises a direct current source circuit 11, an unbalanced transmission circuit 12, and a transformer T1 having a pair of windings n1 and n2 of the same number of turns and wound in the same direction. These windings n1 and n2 of the transformer T1 are respectively inserted in each line of the two parallel cables 1, and terminals t1 and t2 of the windings n1 and n2 for connection with the cables 1 are provided at the same polarity ends of the windings n1 and n2. Between these terminals t1 and t2 of the windings n1 and n2, there are inserted two series circuits of capacitors and resistors C1, R1 and C2, R2 for blocking any direct current. The other end of the winding n1 is connected to an input side of the source circuit 11 and, through a direct-current blocking capacitor C3, to the transmission circuit 12, whereas the other end of the winding n2 is connected to the junction, i.e., middle point of the two series CR circuits. Further, the transmitter 10 is provided with a terminal t3 connected to an output side of the direct current source circuit 11, a terminal t4 connected to an earthing point i.e., the junction, of the two series CR circuits and of the other end of the winding n2, and a terminal t5 connected to an input side of the unbalanced transmission circuit 12. In this case, the transmitter 10 is supplied with power by means of a direct current voltage applied through the terminals t3 and t4, while image signals are provided as an input to the terminals t4 and t5.

Figure 2:
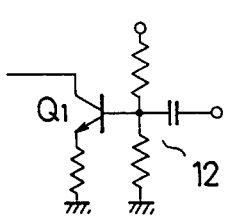
FIG. 2 is a circuit diagram of an unbalanced transmission circuit employed in the device of FIG. 1.

In addition, in the foregoing arrangement, the resistors R1 and R2 of the series CR circuits are equal in impedance value to each other. For the unbalanced transmission circuit 12, more concretely, a transistor Q1 may be employed as shown in FIG. 2.

The receiver 20 comprises a direct current source circuit 21 and an unbalanced reception circuit 22, and includes substantially the same transformer T2 as the transformer T1 in the transmitter 10. Thus the transformer T2 has a pair of windings n3 and n4 wound with the same number of turns and in the same direction. These windings n3 and n4 of the transformer T2 are also inserted respectively in each line of the two parallel cables 1, and terminals t6 and t7 of the windings n3 and n4 for their connection to the cables 1 are provided at the same polarity ends of the windings n3 and n4. Between these terminals t6 and t7, there are also inserted two series circuits of capacitors and resistors C4, R3 and C5, R4 for direct current blocking. The other end of the winding n3 is connected to an input side of the source circuit 21 and, through a direct current blocking capacitor C6, to the reception circuit 22, and the other end of the winding n4 is connected to the junction point between the two series CR circuits and is also earthed. Further, the receiver 20 is provided with a terminal t8 connected to an output side of the direct current source circuit 21, and with a terminal t9 connected to an input side of the unbalanced reception circuit 22, so that a direct current voltage may be applied to the terminal t8 while a television terminal, for example, may be connected to the terminal t9.

Figure 3:
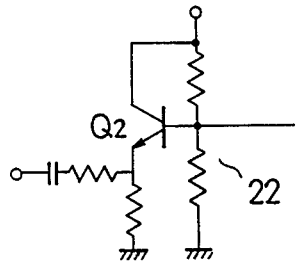
FIG. 3 is a circuit diagram of unbalanced reception circuit employed in the device of FIG. 1.

Also in the foregoing receiver 20, the resistors R3 and R4 in the series CR circuits are mutually equal in impedance value. More concretely, it is preferable that the unbalanced reception circuit 22 employs therein an emitter follower transistor Q2 as shown in FIG. 3.

Referring next to the operation of the balanced transmission device shown in FIG. 1, image signals, i.e., alternating current signals are transmitted through a path of the terminal t5 → unbalanced transmission circuit 12 → winding n1 → winding n3 → unbalanced reception circuit 22 → winding n4 → winding n2, upon which magnetic fluxes due to the image signals at the both transformers T1 and T2 to cancel each other so that the transformers T1 and T2 do not influence the transmission. Further, a direct current is supplied through a path of the direct current source circuit 21 → winding n3 → winding n1 → direct current source circuit 11 → winding n2 → winding n4, upon which the magnetic fluxes of the transformers T1 and T2 cancel each other so as to prevent any magnetic saturation from occurring, and the transformers T1 and T2 also do not influence the transmission.

Further, any external noise coming from the exterior to the two parallel cables 1 is provided as in-phase signals into the both lines of the cables 1 so as to cause an electric current to flow through the both windings n1, n2 and n3, n4 in each of the transformers T1 and T2 in the same direction so that the transformers will show a high impedance, while the currents due to the external noise are caused to flow through the resistors R1, R2 and R3, R4 to the earthing points. Since the resistors R1-R4 are of the same value, there is produced no potential difference between the lines of the cables 1, and thereby the transmission system is not affected by the external noise. In an event where the external noise is a relatively low frequency, the transformers T1 and T2 do now show the high impedance but, as induced voltages in the cables 1 are not high enough, the external noise can be smoothly absorbed.

Figure 4:
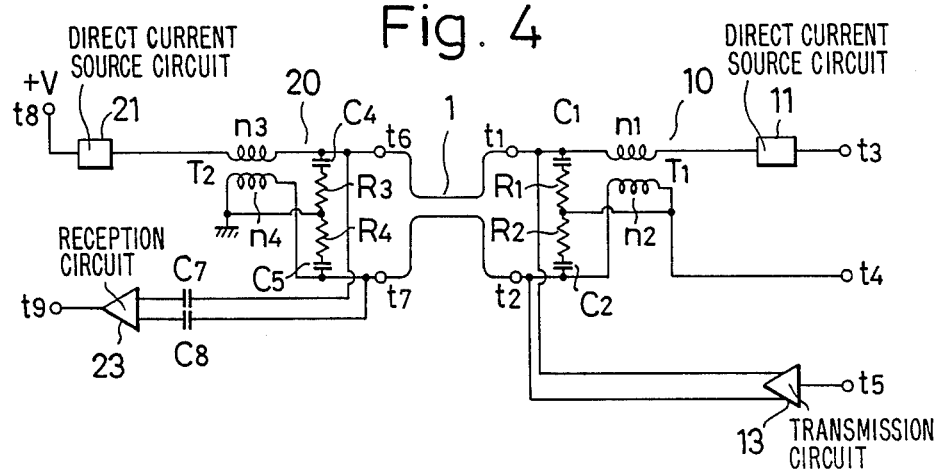
FIG. 4 is a circuit diagram of the balanced transmission device in another embodiment according to the present invention.

Referring now to FIG. 4, there is shown another embodiment of the balanced transmission device, in which substantially the same constituents as those in the embodiment of FIG. 1 are denoted by the same reference numerals as those used in FIG. 1. In the present instance, in particular, the arrangement is so made that the image signals can be applied across the terminals t1 and t2 through a transmission circuit 13 which executes unbalanced/balanced conversions, while input side of a reception circuit 23 which executes balanced/unbalanced conversions is connected through capacitors C7 and C8 to the terminals 6 and 7. Since in the arrangement of this embodiment the windings n1-n4 of the transformers T1 and T2 are not interposed in the transmission system of the image signals, in contrast to the embodiment of FIG. 1, the transformers T1 and T2 even if there is flux leakage can be employed without any trouble. Other arrangements and functions in this embodiment are the same as those in the embodiment of FIG. 1.

Figure 5:
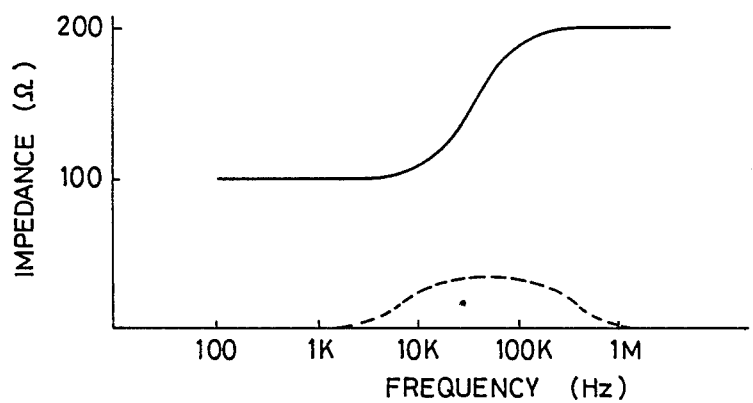
FIG. 5 is an impedance characteristics diagram for the device of FIG. 4.
Figure 6:
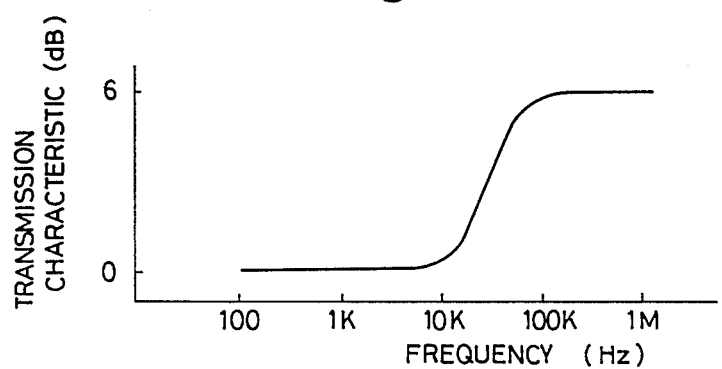
FIG. 6 is a transmission characteristics diagram for the device of FIG. 4.

In both of the foregoing embodiments shown in FIGS. 1 and 4, at high frequencies, assuming the windings n1-n4 of the transformers T1 and T2 are of an inductance of 0.5 mH and the resistors R1-R4 are of a resistance value of 100 Ω, the resistance value denoted by a solid line curve as well as the reactance denoted by a dotted line curve are increased as shown in FIG. 5, and the transmission characteristics in the high frequency zone will not be flat as shown in FIG. 6, so that there may arise a demand that the device has an arrangement adapted for use at high frequencies.

Figure 7:
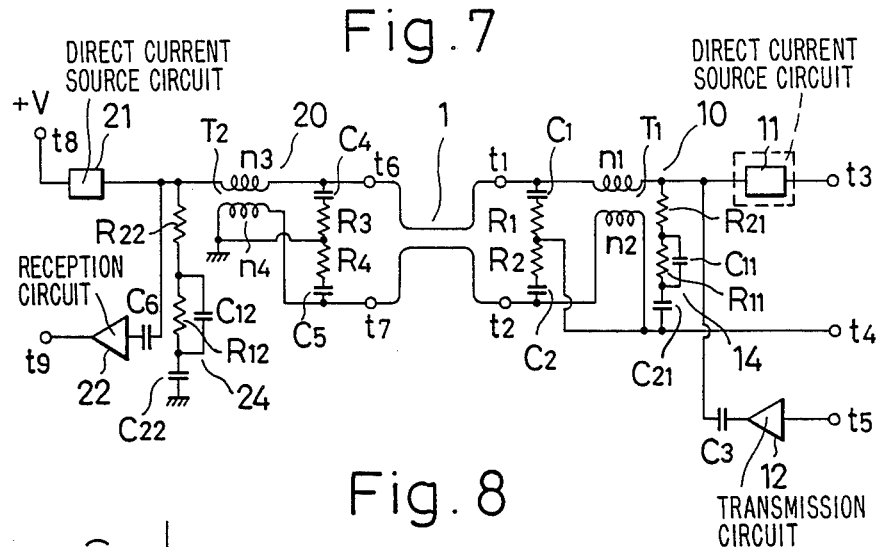
FIG. 7 is a circuit diagram of the balanced transmission device in still another embodiment according to the present invention.
Figure 8:
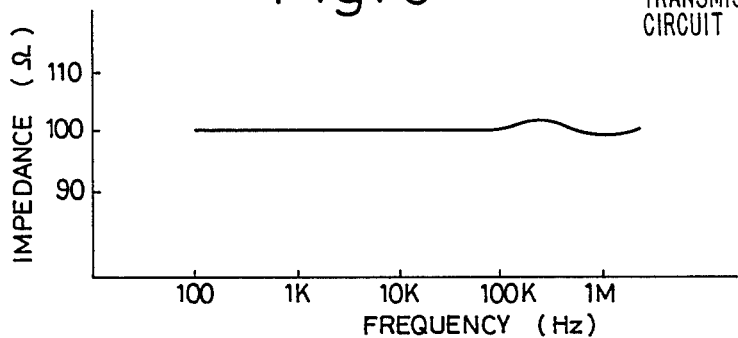
FIG. 8 is an impedance characteristics diagram for the device of FIG. 7.
Figure 9:
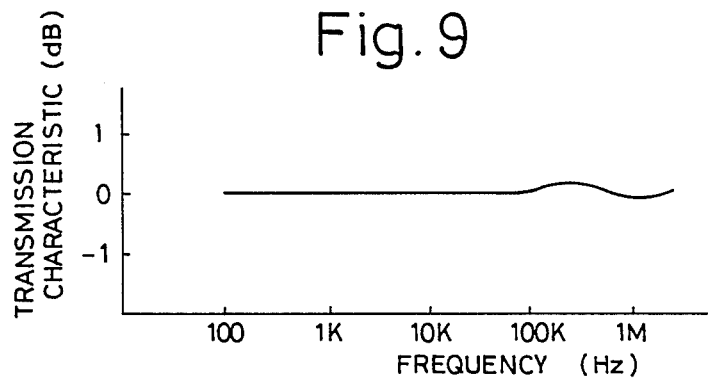
FIG. 9 is a transmission characteristics diagram for the device of FIG. 7

Now, according to another feature of the present invention, there is provided a balanced transmission device which can realize smoothly the use of the device in the high frequency zone. Referring here to an embodiment shown in FIG. 7, substantially the same constituents as those in the FIGS. 1 and 4 embodiments are denoted by the same reference numerals as those employed in FIGS. 1 and 4. In the present instance, in particular, the transmitter 10 and receiver 20 respectively include a compensating circuit 14 and 24 respectively, comprising a parallel circuit of a capacitor C11 or C12 and resistor R11 or R12, a resistor R21 or R22 connected in series to an end of the parallel circuit and a capacitor C21 or C22 connected in series to the other end of the parallel circuit. The compensating circuit 14 or 24 is inserted between a junction point of the winding n1 to the direct current source circuit 11 or of the winding n3 to the direct current source circuit 21 and an earthing point. Here, it has been found that, when the resistors R1-R4 are of a resistance value of 200 Ω, the resistors R21 and R22 are 133 Ω, the resistors R11 and R12 are of 67 Ω and the capacitors C11 and C12 are of a capacity of 100 nF, the large increase in impedance as well as the large change in the transmission characteristics are restrained as shown in FIGS. 8 and 9. In the present embodiment, other arrangements and their functions are the same as those in the foregoing embodiments, and the compensating circuits 14 and 24 inserted on opposite sides of the transformers T1 and T2 with respect to the two parallel cables 1 do not impair the blocking action with respect to external noise.

Figure 10:
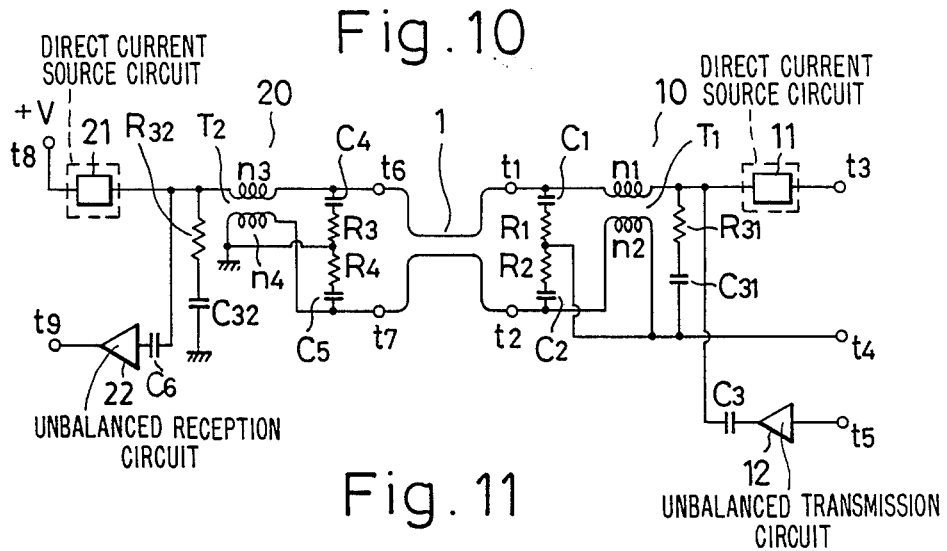
FIG. 10 is a circuit diagram of a still further embodiment according to the present invention.
Figure 11:
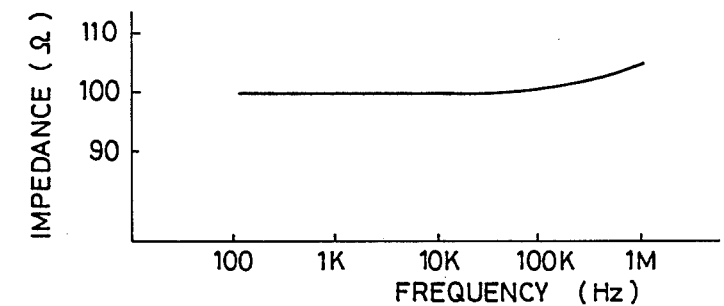
FIG. 11 is an impedance characteristics diagram for the device of FIG. 10.
Figure 12:
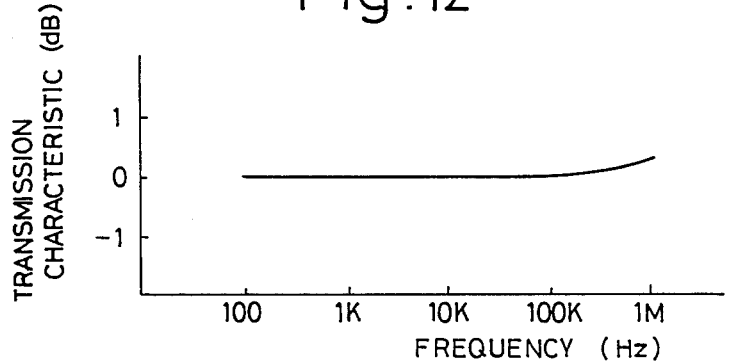
FIG. 12 is a transmission characteristics diagram for the device of FIG. 10.

Referring to a further embodiment shown in FIG. 10, substantially the same constituents as those in the FIGS. 1 and 4 embodiments are denoted by the same reference numerals as those used in FIGS. 1 and 4. In the present instance, in particular, the compensating circuit is simplified as compared with the one in the FIG. 7 embodiment, and comprises a series circuit of a resistor R31 or R32 and a capacitor C31 or C32 and inserted between the junction point of the winding nl to the direct current source circuit 11 or of the winding n3 to the direct current source circuit 21 and the earthing point. Here, when the resistors Rl–R4 are made to be of a resistance value of 1 k$\Omega$, the resistors R31 and R32 are of 110 $\Omega$ and the windings nl–n4 of the transformers Tl and T2 are of an inductance of 0.5 mH, the impedance can be made substantially constant as shown in the diagram of FIG. 11, and the transmission characteristics can be also made sufficiently flat as shown in FIG. 12.

What is claimed is:

1. A balanced transmission device for a superposed transmission with noise influence restrained by means of a high impedance, the device comprising two parallel cables, superposed transmission means which superposes alternating current signals on a direct current source means and transmits them through said parallel two-wire cables, a pair of equal value, series connected impedance means connected respectively between a pair of terminals to which said two parallel cables are connected and an earthing point at a junction of the impedance means, and transformer means as a high impedance element, the transformer means including a pair of windings wound in the same direction, each winding having corresponding polarity first and second ends, the first ends being connected to said terminals, the second end of one of said windings being connected to said direct current source means and the second end of the other winding being connected to said earthing point.

2. A device according to claim 1 wherein a receiving circuit for executing balanced/unbalanced conversions is connected to said terminals to which said two parallel cables are connected.

3. A device according to claim 1 wherein an unbalanced signal transmission circuit is connected to the junction of the second end of said one of said windings of said transformer means and said direct current source means.

4. A device according to claim 1 wherein a compensating circuit is connected between said second ends of both of said windings of said transformer on the side of said direct current source means for flattening the transmission characteristics.

5. A device according to claim 1 wherein a transmission circuit which executes balanced/unbalanced conversions is connected to said terminals to which said two parallel cables are connected.

6. A device according to claim 1 wherein a balanced signal receiving circuit is connected to the junction of the second end of said one of said windings of said transformer means and said direct current source means.

* * * * *